(12) United States Patent
Hirakawa

(10) Patent No.: US 9,055,178 B2
(45) Date of Patent: Jun. 9, 2015

(54) SINGLE-SHOT HIGH DYNAMIC RANGE IMAGING

(75) Inventor: Keigo Hirakawa, Oakwood, OH (US)

(73) Assignee: University of Dayton, Dayton, OH (US)

(*) Notice: Subject to any disclaimer, the term of this patent is extended or adjusted under 35 U.S.C. 154(b) by 0 days.

(21) Appl. No.: 13/600,211

(22) Filed: Aug. 30, 2012

(65) Prior Publication Data

US 2013/0076947 A1 Mar. 28, 2013

Related U.S. Application Data

(60) Provisional application No. 61/528,924, filed on Aug. 30, 2011.

(51) Int. Cl.
*H04N 5/228* (2006.01)
*H04N 9/04* (2006.01)
*H04N 5/44* (2011.01)

(52) U.S. Cl.
CPC ... *H04N 9/04* (2013.01); *H04N 5/44* (2013.01)

(58) Field of Classification Search
USPC ............. 348/222.1, 221.1, 229.1, 362–368
See application file for complete search history.

(56) References Cited

U.S. PATENT DOCUMENTS

| 8,248,481 | B2 | 8/2012 | Savidge | |
|---|---|---|---|---|
| 8,294,797 | B2 | 10/2012 | Choe et al. | |
| 2008/0247672 | A1* | 10/2008 | Kaplinsky et al. | 382/300 |
| 2010/0085452 | A1 | 4/2010 | Hirakawa et al. | |
| 2010/0271512 | A1* | 10/2010 | Garten | 348/239 |
| 2011/0211099 | A1 | 9/2011 | Nayar et al. | |
| 2012/0206582 | A1 | 8/2012 | DiCarlo et al. | |

OTHER PUBLICATIONS

Therrien, et al.; "An Adaptive Technique for the Enhance Fusion of Low-Light Visible with Uncooled Thermal Infrared Imagery"; Image Processing; Proceedings . . . , International Conference on ; Oct. 26, 1997; vol. 1;pp. 405-408.*
Generalized Assorted Pixel Camera: Postcapture Control of Resolution, Dynamic Range, and Spectrum, Fumihito Yasuma et al., IEEE Transactions on Image Processing, vol. 19, No. 9, Sep. 2010.

* cited by examiner

*Primary Examiner* — Mekonnen Dagnew
(74) *Attorney, Agent, or Firm* — Porter, Wright, Morris & Arthur LLP

(57) ABSTRACT

A method for generating a high dynamic range image. An image is captured using a Bayer pattern color filter array to generate raw pixel sensor data for the image. The pixel sensor data is separated into highpass ($Z_i^{HP}$) and lowpass ($Z_i^{LP}$) components. The color components of $Z_j^{HP}$ are pooled to yield an achromatic highpass data set $\hat{X}_i^{HP}$. Saturated pixels in the $Z_i^{LP}$ components are corrected by borrowing across spectrums to yield the low pass data set $\hat{X}_i^{LP}$, and the high dynamic range image is computed as $\hat{X} = \hat{X}_i^{LP} + \hat{X}_i^{HP}$ 1. A camera system incorporating this method is also provided.

18 Claims, 2 Drawing Sheets ial patent application is incorporated by reference herein.

SINGLE-SHOT HIGH DYNAMIC RANGE IMAGING

CROSS REFERENCE TO RELATED APPLICATIONS

This application claims priority to U.S. Provisional Patent Application No. 61/528,924, filed on Aug. 30, 2011, entitled "Single-Shot High Dynamic Range Imaging With Conventional Camera Hardware." The entire disclosure of the foregoing provisional patent application is incorporated by reference herein.

BACKGROUND

Film and digital photography (including both still and video) generally cannot reproduce the entire available dynamic range range of a scene. As a result, photographers have always had to find an acceptable balance, trading off highlight details for more shadow details and vice versa. The issue is exacerbated with most digital cameras since the single-chip color image sensors used in most digital cameras have a lower dynamic range than most film.

Recently, high dynamic range ("HDR") digital imaging has become popular, producing images with considerable tonal range throughout the color gamut. Typically, such HDR imaging employs two or more captures at varying exposures (e.g, using exposure bracketing or with the help of a flash). The bracketed exposures are then stitched together (using post-capture, post-demosaicking image processing software) to create a single image having a much greater dynamic tonal range than is possible in a single image capture with the particular sensor employed. In other words, an HDR image is recovered from multiple low dynamic range ("LDR") images which together comprise a set of overdetermined observations which collectively provide an adequate coverage of the dynamic range. Though exposure bracketing is typically implemented as a "time multiplexing" of exposure rates, capturing moving objects poses a particular challenge. These time multiplexing techniques also preclude HDR video and handheld camera applications.

Single-shot (i.e., single, non-bracketed exposure) HDR alternatives have been proposed as a way to capture HDR images, particularly for HDR imaging of nonstationary objects. For instance, an exposure mosaicking and assorted pixel arrangement has been proposed for implementing spatially varying pixel exposures. Multisensor and alternative pixel architecture solutions have also been proposed. However, these single-shot HDR solutions require a special purpose or modified hardware.

While a variety of devices and techniques may exist for HDR imaging, it is believed that no one prior to the inventor has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings and images. In the drawings, like numerals represent like elements throughout the several views.

Figure 1:
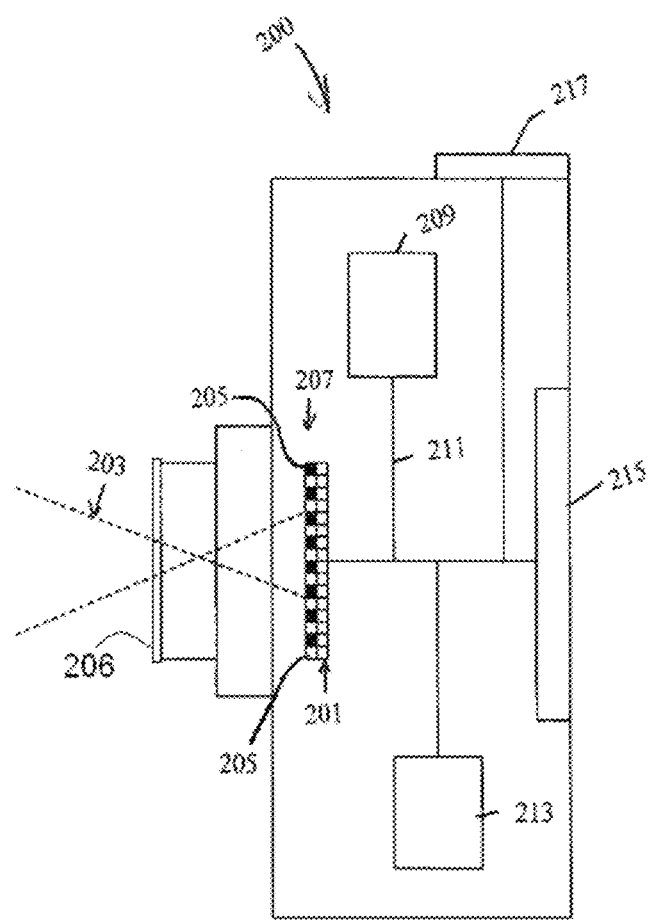
FIG. 1 depicts a schematic illustration of a digital camera which includes a processor programmed to perform the method of the present invention.
Figure 2:
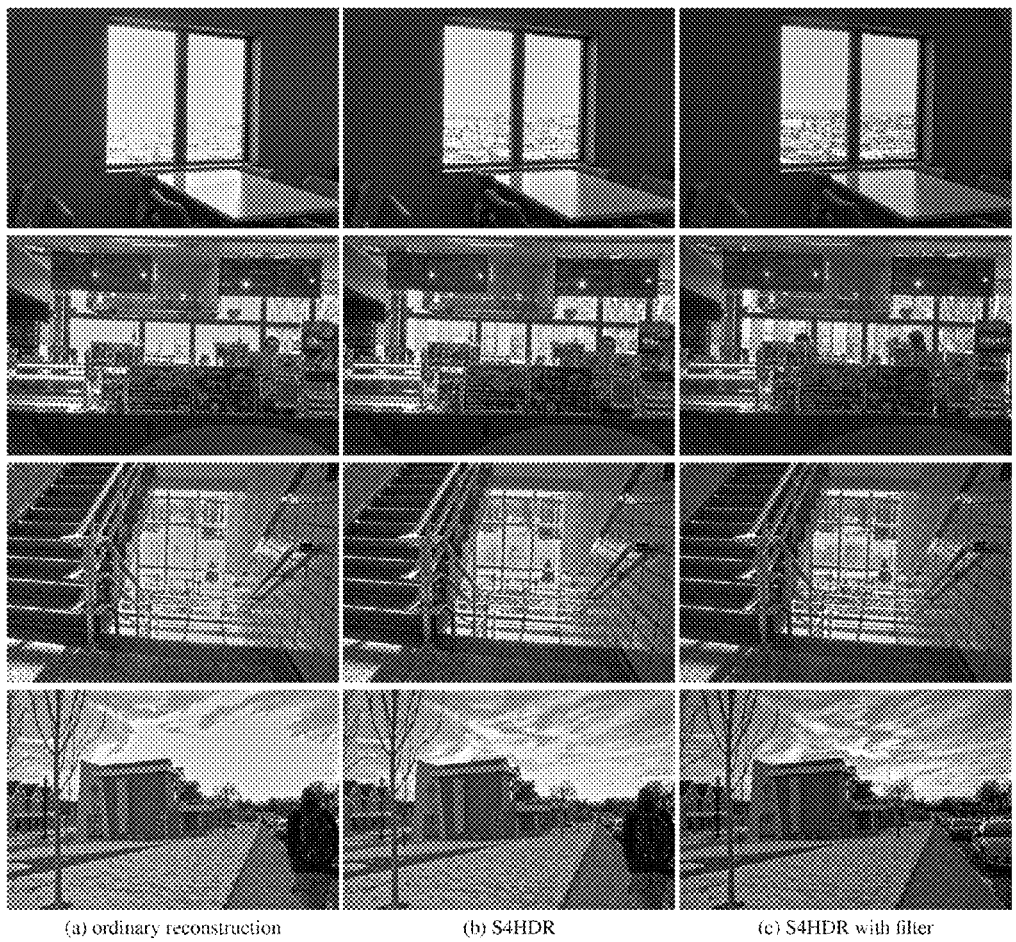
FIG. 2 depicts a series of images reconstructed from RAW pixel sensor data acquired by a conventional DSLR camera, wherein the images of column (a) are ordinary reconstructions (pixel sensor equalization and demosaicking) such as typically done in-camera, the images of column (b) were reconstructed from the same RAW data as in column (a) using the S4HDR method described herein (without an additional filter), and the images of column (c) were reconstructed the S4HDR method described herein from contemporaneous single shot captures with an 85A filter attached to the lens.

The drawings and images are not intended to be limiting in any way, and it is contemplated that various embodiments of the invention may be carried out in a variety of other ways, including those not necessarily depicted in the drawings and images. The accompanying drawings and images incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the versions disclosed herein will become apparent to those skilled in the art from the following description, which is by way of illustration, one of the best modes contemplated for carrying out the invention. As will be realized, the versions described herein are capable of other different and obvious aspects, all without departing from the invention. Accordingly, the drawings and descriptions should be regarded as illustrative in nature and not restrictive.

Unless the context indicates otherwise, the phrase "HDR image" means an image having greater dynamic range than that obtained with the same sensor for a single image using conventional data processing (i.e., equalization and demosaicking).

Most conventional single-chip color image sensors today make use of a color filter array (CFA), a spatial multiplexing of absorptive red, green, and blue filters positioned over an array of pixel sensors. The typical CFA in most digital cameras employs the Bayer pattern of red, blue and green filters, as described in U.S. Pat. No. 3,971,065 (which is in incorporated herein by way of reference). The Bayer pattern is a repeating 2×2 arrangement of filters comprising alternating rows of red-green and green-blue filters. In other words, the first row comprises alternating red and green filters (no blue), the second row comprises alternating green and blue filters (no red), and this pattern repeats in successive rows. Thus, each 2×2 square in the Bayer pattern contains one red filter, one blue filter and two green filters. Twice as many green filters are provided as compared to red or blue because the human visual system is more responsive to green light.

After an image capture, the raw pixel sensor data ("RAW" format) will generally comprise data representing the light intensity measured by each pixel sensor. However, since each pixel sensor of a Bayer array only measures light intensity of predominantly one color (red, green or blue), the RAW data must be converted into image data representing all three colors for each pixel. This process is referred to as demosaicking, and variety of algorithms have been developed for this process. In general, the data from adjacent pixel sensors is mathematically combined in order to provide a three color estimate of light for each pixel location.

The three color filters in a CFA, however, have different translucency. For example, the green filter in most Bayer pattern CFA's has a greater translucency than the red and blue filters, meaning that more photons are allowed to penetrate through the green filters compared to the red or blue filters. In order to account for these differences, a color space transformation matrix must be applied to the RAW pixel sensor data in order to convert that data into a useable color space such as sRGB (standard RGB color space). This conversion essentially equalizes the RAW pixel sensor data by modifying the pixel sensor data to account for the differences in red, blue and green filter translucency. The matrix for converting RAW sensor data to a color space such as sRGB is manufacturer specific, and in many instances camera specific.

By way of example, suppose raw sensor measurements of a Gretag Macbeth®ColorChecker® chart are captured under simulated sunlight. Regressing the sample means of the pixel values observed within the same colored squares of the chart onto published reflectance values produces a matrix $A \in \mathbb{R}^{3 \times 3}$ that maps the RAW sensor data for the red, blue and green pixel sensors to the linear sRGB space. For the Nikon® D90™ camera, for example, the color space transformation matrix is $$A = \begin{pmatrix} 1.001 & -0.165 & -0.051 \\ -0.004 & 0.336 & -0.095 \\ 0.034 & -0.101 & 0.393 \end{pmatrix}. \quad (1)$$

The channel "exposure" corresponds to $e = A^{-1} 1 \in \mathbb{R}^3$, wherein $1 = (1,1,1)^T$ is a neutral linear light in sRGB space. Thus, the channel exposure for the Nikon D90 camera in (1) is $$e = (1.8271\ 3.9605\ 3.4043)^T$$

Although A combines the hardware specific (CFA color filter translucencies) and the environment (e.g. illuminant) parameters, the contribution of simulated sunlight to e is limited owing to the relative flatness of the sunlight spectrum. Hence the differences in translucency of the red, green, and blue filters of the CFA are largely responsible for the unequal diagonal elements of e. From the foregoing, it may also be concluded that the translucency of the green CFA filter is more than twice that of (i.e., more than one stop greater than) the red CFA filter in the Nikon D90 camera, and the translucency of the green filter is only slightly greater than the blue filter. In practice, channel exposure e is hardware specific. For some manufacturers or cameras, for example, the translucency of the red and/or blue filters of the CFA may be higher than that of the green filters of the CFA. However, the color space transformation matrix, and hence the channel exposure e may be easily determined in the same manner described above or is readily available (e.g., from the dcraw open source software).

One reason why the color space transformation matrix and corresponding channel exposure e is manufacturer, and often times camera specific is that the relative translucencies of the filters in CFAs vary considerably. In fact, some CFAs may exhibit little difference in the translucencies of the red, blue and green filters, while in others there may be even greater differences than that discussed above with respect to the Nikon D90. However, as further discussed herein, even where the filter translucency differences are small (e.g., less than one stop), one or more photographic filters may be used to magnify (or in some cases create) differences in translucencies between the red, green and blue filters of the CFA.

A major advantage of digital photography is the flexibility of postprocessing afforded by the digital format. In particular, color balance can be achieved posthoc by performing color space conversion on the acquired RGB data. A photographic filter mounted on the lens serves a similar purpose for film cameras by changing the spectrum of the incoming light. The spectral response of such photographic filters mounted on a camera lens are often described in terms of Wratten number. For example, a "warming" filter with a Wratten number of 85A or 85B attenuates the blue channel by ⅔ stops in order to map 5500K color temperature to 3400K or 3200K, respectively. A "cooling" filter with a Wratten number of 80A or 80B has the opposite effect, attenuating the red and green channels by 2 or 1⅔ stops, respectively.

Not surprisingly, the usage of photographic filters for color balancing is rare in digital photography since color balancing can be readily accomplished during processing of the raw pixel sensor data. However, these filters do provide a way to magnify (or create) differences in the effective translucencies of the red, green, and blue CFA filters. For example, an 85A or 85B filter on the camera lens will reduce primarily the number of blue photons (and, to a lesser extent, green photons) striking the sensor array. The end result is equivalent to a reduction in the translucency of the blue filters in the CFA. Mathematically, the channel exposure is now computed as $e = P^{-1}A^{-1}1$, wherein $P \in \mathbb{R}^{3 \times 3}$ models the attenuation of incoming light that the filter provides.

By way of example, a Nikon D90 equipped with a Hoya® 85A filter attenuated the red, green, and blue channels by factors of 1.04, 1.51, and 2.70, respectively. Overall, the effective translucency of the green pixels is at least twice that of the blue pixels, achieving an even greater leverage for CFA-based exposure bracketing, as further described herein. It is also possible to stack multiple filters to further amplify the effects of the filter (e.g., by adding a red absorptive filter in order to create a greater difference in effective translucency between the green and red pixels). And while the filter is most easily positioned on the camera lens (e.g., affixed in front of the lens such as by treaded attachment or the use of a filter mount), one or more filters can be positioned anywhere along the optical path between the scene being imaged and the pixel sensor array.

In some embodiments of the apparatus and methods herein, the difference in effective translucency between at least two filter colors of the CFA is at least one stop (e.g., red-green and/or green-blue). This difference may be inherent to the color filters of the CFA itself, or may be provided by the inherent translucencies of the color filters of the CFA in combination with one or more color-attenuating filters placed in the optical path (e.g., on the end of the camera lens). In other embodiments, the difference in effective translucency between at least two pairs of filter colors of the CFA is at least one stop (e.g., one stop difference between red and green, and one stop difference between red and blue). In still other embodiments, the difference in effective translucency between all three pairs of filter colors of the RGB Bayer pattern CFA (red-green, green-blue and red-blue) is at least one stop.

In the conventional method of creating HDR images, the key to blending together multiple low dynamic range ("LDR"), exposure-bracketed images to form a single HDR image is to draw from optimally exposed regions of LDR images that are least affected by quantization, noise, and saturation. For example, when creating a composite HDR image from three captures at −1EV, 0EV, and +1EV, data from shadow (or low light) regions of the +1EV dataset will be given greater weight than data from those same regions of the −1EV and OEV datasets. Applicant has found that the differences in translucency of the red, green and blue CFA filters can be exploited in a somewhat analogous manner in order to achieve an HDR image (or an image with increased dynamic range) from a single image capture (i.e., single-shot) using conventional camera hardware. In particular, HDR (or increased dynamic range) images can be achieved using conventional CFAs having uniform red, green and blue filters (i.e., every red filter in the CFA is the same, every green filter is the same, etc.). In addition, although the invention will be described with reference to a Bayer CFA, the scope of the present invention is not so limited. For example, the invention may be implemented with CFA's employing RGBW patterns—red, green, blue and white (transparent to all wavelengths).

Based in part on the notion that red, green, and blue components of natural color images are highly correlated, applicant has demonstrated that the color channels of raw sensor data for a single image capture comprise a set of overdetermined observations with diverse exposure rates. As further described herein, optimally exposed regions of LDR red/green/blue color components are merged in a principled manner to yield one HDR color image based on rigorous image formation models. This approach will be referred to as spectrally-selective single-shot HDR, or "S4HDR" for short.

Applicant has discovered that the information redundancy in color images can be exploited to provide single-shot HDR imaging. One key observation in color image processing that has enabled the likes of demosaicking and compression is that the spatially highpass components of the red, green, and blue channels are similar. Thus, the color radiance map $X_i = (R_i, G_i, B_i)^T \in \mathbb{R}^3$ (wherein $i=(i_x, i_y)$ denotes the spatial index of pixels) is separable into lowpass ($^{LP}$) and highpass ($^{HP}$) components:

$$\underbrace{\begin{pmatrix} R_i \\ G_i \\ B_i \end{pmatrix}}_{X_i} = \underbrace{\begin{pmatrix} R_i^{LP} \\ G_i^{LP} \\ B_i^{LP} \end{pmatrix}}_{X_i^{LP}} + X_i^{HP} \underbrace{\begin{pmatrix} 1 \\ 1 \\ 1 \end{pmatrix}}_{1}.$$

Here, $X_i^{HP}$ is the highpass shared by all RGB channels. From this perspective, the lowpass represents the underlying "baseline" that describes textures and edges, and the highpass encodes the "deviation" from the baseline.

Recalling that the channel exposure is $e = A^{-1} 1$, and ignoring the spatial subsampling in the color filter array for the moment, the following sensor measurement is obtained:

$$Z_i = (r_i, g_i, b_i)^T \quad (2)$$
$$= f(A^{-1} X_i)$$
$$\approx \max(\min(A^{-1} X_i, z_{max}), z_{min})$$
$$= \underbrace{\max(\min(A^{-1} X_i^{LP}, z_{max}), z_{min})}_{Z_i^{LP}} + \underbrace{X_i^{HP} \Phi_i e}_{Z_i^{HP}}.$$

In the above equation, $f(\bullet)$ is a monotonic sensor response function, which is assumed to be linear (with slope one) near the middle of the curve, and saturates when under/over-exposed. $\Phi_i$ is a diagonal matrix whose entries indicate saturation (1=not saturated; 0=saturated). Saturated signals are locally lowpass because saturation occurs in batches of pixels.

Given the relationship of the highpass and lowpass components of sensor measurement as defined in equation (2) above, HDR image recovery from tristimulus LDR sensor data $Z_i$ can be accomplished. Since $X_i^{HP}$ is overdetermined while $X_i^{LP}$ is potentially underdetermined, each requires a different strategy for reconstruction. Applicant's S4HDR method generally comprises the following steps:

1. Sensor data $Z_i$ is separated into highpass ($Z_i^{HP}$) and lowpass ($Z_i^{LP}$) components using a convolution filter (e.g., a Gaussian convolution filter).
2. Color components of $Z_i^{HP}$ are pooled together to yield an achromatic highpass data set $\hat{X}_i^{HP}$ (see equations (3) and (4) below).
3. Saturated pixels in $Z_i^{LP}$ are corrected by borrowing across spectrums to yield $\hat{X}_i^{LP}$ (see equations (6) and (8) below).
4. The final HDR image is computed as $\hat{X} = \hat{X}_i^{LP} + \hat{X}_i^{HP} 1$.

Theory Behind S4HDR Method

With respect to step 2 of Applicant's S4HDR method, $\hat{X}_i^{HP}$ may be recovered from $Z_i^{HP}$ based on the following relationship:

$$\hat{X}_i^{HP} := t_i^T Z_i^{HP} = X_i^{HP} t_i^T \Phi_i e. \quad (3)$$

The desired weighting vector $t_i$ is an inverse of $\Phi_i e$ in the sense that we want $t_i^T \Phi_i e$ i to evaluate to unity. Owing to the fact that the inverse is not unique unless two color components are saturated, we have the ability to weigh $t_i$ by the importance of individual color components:

$$(r_i^{HP}, g_i^{HP}, b_i^{HP})^T = Z_i^{HP}$$

To this end, regions of color components that are better exposed are given more weight:

$$t_i = \frac{\pi_i}{\pi_i^T \Phi_i e}, \quad (4)$$

where $\pi_i = (\pi_i^r, \pi_i^g, \pi_i^b)^T \in [0,1]^3$ is the fuzzy membership of pixels in the nonsaturated region, such as for red:

$$\pi_i^r = \left| \frac{z_{max} + z_{min} - 2r_i}{z_{max} + z_{min}} \right|. \quad (5)$$

The recovery of the lowpass signal $X_i^{LP}$ from $Z_i^{LP}$—a potentially saturated version of the signal $A^{-1} X_i^{LP}$—is an underdetermined problem. Since there are many solutions for $X_i^{LP}$ that map to $Z_i^{LP}$, the solution space of $X_i^{LP}$ must be regularized. One sensible solution among the feasible solutions is the "most neutral" tristimulus value:

$$\hat{X}_{i,reg}^{LP} = \underset{X_i^{LP}}{\operatorname{argmin}} \|C_i\|^2 + \|D_i\|^2, \quad (6)$$

$$\text{subject to } Y_i^{LP} = (L_i, C_i, D_i)^T = M X_i^{LP}$$

$$\Phi_i Z_i^{LP} = \Phi_i A^{-1} M^{-1} Y_i^{LP},$$

where the matrix $M \in \mathbb{R}^{3 \times 3}$ transforms RGB tristimulus values into luminance ($L_i$) and chrominance ($C_i, D_i$). Linear algebra yields the following closed form solution:

$$\hat{X}_{i,reg}^{LP} = A \Phi_i Z_i^{LP} - A_s (A_s^T M^T \Psi M A_s)^{-1} A_s^T M^T \Psi M A \Phi_i Z_i^{LP} \quad (7)$$

where $\Psi = \operatorname{diag}(0,1,1)$ and $A_s$ is a submatrix of A whose rows correspond to the saturated pixels. Intuitively, this is a projection of the nonsaturated pixel components onto a space of feasible colors that approximate neutral light. The regularization in (6) is consistent with prior work showing that pixels with high risk for over-exposure likely correspond to neutral colors, meaning the grayworld assumption holds better in the region-of-interest. Also, human vision is reportedly less sensitive to chrominance in the darkest regions of the image (i.e. underexposed pixels). In practice, this scheme succeeds when $\|\Psi M\ A\Phi_i Z_i^{LP}\| \gg \|\Psi M\ X_i^{LP}\|$ (see equation (7)). To safeguard against the possibility that transition towards saturation is a gradual one, the final estimate of $X_i^{LP}$ will be a convex combination:

$$\hat{X}_i^{LP} = A(\text{diag}(\pi_i) Z_i^{LP} + \text{diag}(1-\pi_i) A^{-1} \hat{X}_{i,reg}^{LP}), \quad (8)$$

where $\pi_i$ is the aforementioned fuzzy membership. The final HDR reconstruction is $\hat{X} = \hat{X}_i^{LP} + \hat{X}_i^{HP} 1$.

Demosaicking Effects on Pixel Sensor Data

Once RAW pixel sensor data has been demosaicked, it is no longer possible to construct a HDR image from the image. The reason for this is that demosaicking forces the RGB channels to share the highpass data, hence preventing the use of Applicant's S4HDR method. In particular, the Fourier analysis of a Bayer CFA dataset is:

$$F\{\alpha_i\}(\omega) + F\{\beta_i\}\left(\omega - \begin{pmatrix} 0 \\ \pi \end{pmatrix}\right) + F\{\beta_i\}\left(\omega - \begin{pmatrix} \pi \\ 0 \end{pmatrix}\right) + F\{\gamma_i\}\left(\omega - \begin{pmatrix} \pi \\ \pi \end{pmatrix}\right) \quad (9)$$

wherein $\mathcal{F}\{\bullet\}$ is a Fourier transform operator, $\omega = (\omega_x, \omega_y)$ denote two dimensional spatial frequency, and $$\begin{pmatrix} \alpha_i \\ \beta_i \\ \gamma_i \end{pmatrix} = \underbrace{\begin{pmatrix} \frac{1}{4} & \frac{1}{2} & \frac{1}{4} \\ \frac{1}{4} & 0 & -\frac{1}{4} \\ \frac{1}{4} & -\frac{1}{2} & \frac{1}{4} \end{pmatrix}}_{N} Z_i. \quad (10)$$

Owing to the invertibility of N, the problem of demosaicking is equivalent to the recovery of $(\alpha_i, \beta_i, \gamma_i)$. The overlapping support of the summands in equation (9) indicate aliasing (e.g., both $\mathcal{F}(\alpha_i)(\omega)$ and $\mathcal{F}(\beta_i)(\omega - \binom{\pi}{0})$ are nonzero for some value of $\omega$); and demosaicking performance improves when the regions of overlap is reduced by the bandlimitedness of $\beta_i$ and $\gamma_i$. Indeed, the advantage to representation in equation (10) is that the difference images $\beta_i$ and $\gamma_i$ enjoy rapid spectral decay (i.e., they do not retain $X_i^{HP}$) and can serve as a proxy for chrominance. On the other hand, the "baseband" image $\alpha_i$ can be taken to approximate luminance where $X_i^{HP}$ is preserved by the relation:

$$\hat{X}_i^{HP} \propto \alpha_i^{HP} = \underbrace{\left(\frac{1}{4}\ \frac{1}{2}\ \frac{1}{4}\right)}_{weights} Z_i^{HP} \quad (11)$$

(from first row of equation (10)). Hence, a demosaicking operating on CFA data is expected to recover the highpass signal $\hat{X}_i^{HP}$ that is proportional to $\alpha_i^{HP}$ in equation (11). Contrasting the linear combination of $Z_i^{HP}$ in (11) (where the implied weights are (¼, ½, ¼)) to a more desirable weighting vector of (4) above, it is concluded that (11) ignores the inherent exposure bracketing of a CFA entirely. Thus, the demosaicking output under the ordinary scenario is LDR.

Consider an alternative setup. Most modern digital cameras perform post-capture, pre-demosaicking "equalization" aimed at neutralizing the exposure bracketing by scaling red, green, blue channels by the inverse of exposure e. Mathematically, this is equivalent to replacing every instance of $Z_i$ in (9-11) with $\text{diag}(e)^{-1} Z_i$. For example, (10) is updated as follows:

$$\begin{pmatrix} \alpha_i \\ \beta_i \\ \gamma_i \end{pmatrix} = N \text{diag}(e)^{-1} Z_i^{LP} + X_i^{HP} \underbrace{N \text{diag}(e)^{-1} e}_{(1,0,0)^T}.$$

This suggests that equalization improves demosaicking performance—the bandlimitedness assumptions of $\beta_i$ and $\gamma_i$ are robust and the risk of aliasing is reduced. Updating (11) also, the combination of equalization and demosaicking is expected to recover the highpass signal $X_i^{HP}$ via:

$$\hat{X}_i^{HP} = \alpha_i^{HP} = \underbrace{\left(\frac{1}{4}\ \frac{1}{2}\ \frac{1}{4}\right)}_{weights} \text{diag}(e)^{-1} Z_i^{HP} = X_i^{HP}.$$

Comparing this to the desired weighting vector (4), however, the linear combination of $Z_i^{HP}$ implied by postcapture, pre-demosaicking equalization fails to yield HDR recovery of $X_i^{HP}$.

Applicant's Pre-Demosaicking Processing for HDR Image Generation

The key observation of the previous section is that the highpass signal $\hat{X}_i^{HP}$ recovered from demosaicking is proportional to $\alpha_i^{HP}$. Hence, Applicant has deduced that a post-capture, pre-demosaicking process which precisely controls the linear combination of $Z_i^{HP}$ in $\alpha_i^{HP}$ will yield a HDR image upon demosaicking.

Denoting by diagonal matrix W the pre-demosaicking scaling of red, green, and blue channels, equations (9-11) may be updated. For example, demosaicking recovers $\hat{X}_i^{HP}$ via the relation $$\hat{X}_i^{HP} = \alpha_i^{HP} = \underbrace{\left(\frac{1}{4}\ \frac{1}{2}\ \frac{1}{4}\right) W}_{u_i^T} Z_i^{HP}. \quad (12)$$

The linear weights $u_i$ are controlled indirectly by choosing W intelligently. For example, W may be chosen to satisfy the condition:

$$NWe = (1, 0, \tau)^T. \quad (13)$$

Then, updated equation (11) becomes:

$$\begin{pmatrix} \alpha_i \\ \beta_i \\ \gamma_i \end{pmatrix} = NW Z_i^{LP} + X_i^{HP} \underbrace{NWe}_{(1,0,\tau)^T}. \quad (14)$$

Unlike the equalization example in the previous section concerning demosaicking without preservation of the highpass data, $\tau$ is not required to be zero—$\gamma_i$ may now have larger support in the frequency domain as a result. This "relaxation"

is justifiable because most cameras today have exceedingly high spatial resolution compared to what the optics can provide. Hence the risk of aliasing between $\mathcal{F}\{\alpha_i\}$ and $\mathcal{F}\{\gamma_i\}$ is acceptably low, even though the aliasing risk between $\mathcal{F}\{\alpha_i\}$ and $\mathcal{F}\{\beta_i\}$ remains high. Solving for W in (13), the admissible choices of W are:

$$W_\tau = \text{diag}(e)^{-1}\text{diag}((1+\tau, 1-\tau, 1+\tau)). \quad (15)$$

Allowing $\tau$ and $W_\tau$ to be spatially adaptive, the admissible set in (15) which gives more importance to the regions of color components that are better exposed is chosen. To this effect, one seeks $u_i$ that best approximates the "ideal weights" in equation (4) in the following sense:

$$\hat{\tau}_i = \arg\min_\tau \left\| t_i^T - \left(\frac{1}{4}, \frac{1}{2}, \frac{1}{4}\right) W_\tau \right\|^2. \quad (16)$$

wherein where $t_i$ is as defined previously in equation (3). The closed form solution to this optimization problem is a projection:

$$\hat{\tau}_i = \frac{\left\langle t_i^T - \left(\frac{1}{4}, \frac{1}{2}, \frac{1}{4}\right)\text{diag}(e)^{-1}, \left(\frac{1}{4}, -\frac{1}{2}, \frac{1}{4}\right)\text{diag}(e)^{-1} \right\rangle}{\left\langle \left(\frac{1}{4}, -\frac{1}{2}, \frac{1}{4}\right)\text{diag}(e)^{-1}, \left(\frac{1}{4}, -\frac{1}{2}, \frac{1}{4}\right)\text{diag}(e)^{-1} \right\rangle}.$$

By equation (12), the highpass component of demosaicking output $\hat{Z}_i^{HP}$ is an HDR reconstruction of $X_i^{HP}$. In other words, by applying a diagonal equalization matrix W (which takes into account the different effective translucencies of the filters of the CFA), the color components of $Z_i^{HP}$ are pooled to yield an achromatic highpass data set $\hat{X}_i^{HP}$, effectively approximating equations (3) and (4) above. The image data set is then demosaicked in the usual fashion.

Lastly, the equalization weights $W_i$ have no significant effect on the recoverability of $X_i^{LP}$. Therefore, the demosaicking output $\hat{Z}_i^{LP}$ is processed according to equation (8). The final HDR reconstruction is $\hat{X} = \hat{X}_i^{LP} + \hat{X}_i^{HP} 1$.

In summary, for a system which requires demosaicking, an HDR image may be generated from the raw pixel sensor data by the method:
(a) capturing an image using a Bayer pattern color filter array to generate raw pixel sensor data for the image;
(b) apply a weighting matrix W to the pixel sensor data to provide modified pixel sensor data, wherein W gives more importance to the regions of color components that are better exposed;
(c) demosaicking the modified pixel sensor data;
(d) separating the demosaicked modified pixel sensor data into highpass ($X^{HP}$) and lowpass ($\hat{Z}_i^{HP}$) components;
(e) correcting saturated pixels in the $\hat{Z}_i^{LP}$ components by borrowing across spectrums to yield the low pass data set $\hat{X}_i^{LP}$; and
(e) computing the high dynamic range image $\hat{X} = \hat{X}_i^{LP} + \hat{X}_i^{HP} 1$.

Because the methods and systems described herein can be accomplished using existing hardware, particularly conventional color filter arrays (CFAs) and their associated image sensor arrays, the single-shot HDR imaging described herein may be incorporated into existing still and video cameras (including cell phone cameras) by modifying (also referred to as updating) the firmware or other program instructions used to process sensor data in the imaging device. In this manner, cameras with a limited bit depth datapath will provide the performance of cameras having more complex hardware. These methods and systems are particularly useful for vehicular vision systems which are typically called on to capture images (still or video) in rapidly changing environments (e.g., rapidly changing light) as well as dynamic scenes. Although the single-shot HDR systems and methods described herein generally will not yield results superior to those achieved using time multiplexing HDR imaging, none of these benefits are available to the existing single-shot or multishot HDR solutions.

These differences become even more noticeable when an additional filter designed to attenuate certain spectra of incoming light is applied to the optical path of a camera. Whether these properties of CFA and photographic filters can be exploited for the purpose of high dynamic range (HDR) imaging is a question that has received surprisingly little attention in the extant literature.

In some embodiments, the sensor data is processed in-camera, while in other embodiments the sensor data is processed outside of the camera using image processing software. FIG. 1 is a schematic illustration of a camera system 200 which incorporates the methods of the present invention. Various embodiments of the present invention may include one or more cameras or other image capturing devices. Camera system 200 includes a plurality of light sensitive elements 201 (pixel sensor elements). Each light sensitive element is configured to measure a magnitude of light 203 corresponding to a location within an image being captured. Light 203 passes through the lens, which is schematically shown in FIG. 1 to have a filter 206 mounted on the front of the lens in order to alter the effective translucency of one or more filters of the CFA 205 (e.g., an 80A, 80B, 85A or 85B). Of course more than one such filter 206 may be attached to the front of the lens, as described previously herein.

The plurality of light sensitive elements 201 may include a plurality of photo sensitive capacitors of a charge-coupled device (CCD). Alternatively, the plurality of light sensitive elements 201 may include one or more complementary metal-oxide-semiconductor (CMOS). During image capture, each photosensitive capacitor may be exposed to light 203 for a desired period of time, thereby generating an electric charge proportional to a magnitude of the light at a corresponding image location. After the desired period of time, the electric charges of each of the photosensitive capacitors may then be measured to determine the corresponding magnitudes of light at each image location in order to generate RAW pixel data for the image.

A Bayer pattern CFA 205 is positioned over the pixel sensor array 201 may be disposed on one or more of the light sensitive elements 201. An indication of the magnitudes of light measured by each light sensitive element is transmitted to at least one processor 209. In one embodiment in which a plurality of photosensitive capacitors of a CCD are used as light sensitive elements 201, the current in each photosensitive capacitor is measured and converted into a signal that is transmitted from the CCD to the processor 209. In some embodiments, the processor 209 includes a general purpose microprocessor and/or an application specific integrated circuit (ASIC) and/or a field programmable gate array(s). In some embodiments, the processor includes memory elements (e.g., registers, RAM, ROM) configured to store data (e.g., measured magnitudes of light, processing instructions, demosaiced representations of the original image). In some embodiments, the processor 209 is part of the image capturing device (e.g., camera system 200). In other embodiments, the processor 209 is part of a general purpose computer or other computing device.

In some embodiments, the processor 209 is coupled to a communication network 211 (e.g., a bus, the Internet, a LAN). In some embodiments, one or more storage components 213, a display component 215, a network interface component (not shown), a user interface component 217, and/or any other desired component are coupled to the communication network 211 and communicate with the processor 209. In some implementations, the storage components 213 include nonvolatile storage components (e.g., memory cards, hard drives, ROM) and/or volatile memory (e.g., RAM). In some implementations, the storage components 213 are used to store mosaiced and/or demosaiced representations of images captured using the light sensitive elements 201.

Processor 209 is configured to perform a plurality of processing functions, such as responding to user input, processing image data from the photosensitive elements 201, and/or controlling the storage and display elements 213, 215. In particular, one or more such processors 209 are configured to perform the image data processing functions described above.

In some embodiments, the image capturing device 200 comprises a video camera configured to capture representations of a series of images. In addition to or as an alternative to capturing a representation of a single image, as described above, such a video camera may capture a plurality of representations of a plurality of images over time. The plurality of representations may comprise a video. The video may be stored on a machine readable medium in any format, such as a MPEG or any other electronic file format.

While several devices and components thereof have been discussed in detail above, it should be understood that the components, features, configurations, and methods of using the devices discussed are not limited to the contexts provided above. In particular, components, features, configurations, and methods of use described in the context of one of the devices may be incorporated into any of the other devices. Furthermore, not limited to the further description provided below, additional and alternative suitable components, features, configurations, and methods of using the devices, as well as various ways in which the teachings herein may be combined and interchanged, will be apparent to those of ordinary skill in the art in view of the teachings herein.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A method for generating a high dynamic range image from a single image capture, comprising:
    (a) capturing a single image at a single exposure using a Bayer pattern color filter array to generate raw pixel sensor data for the single image;
    (b) separating the raw pixel sensor data into highpass ($Z_i^{HP}$) and lowpass ($Z_i^{LP}$) components;
    (c) pooling together the color components of $Z_i^{HP}$ to yield an achromatic highpass data set $\hat{X}_i^{HP}$;
    (d) correcting saturated pixels in the $Z_i^{LP}$ components by borrowing across spectrums to yield the low pass data set $\hat{X}_i^{LP}$; and
    (e) computing the high dynamic range image $\hat{X}_i = \hat{X}_i^{LP} + \hat{X}_i^{HP}(1,1,1)^T$, where $(1,1,1)^T$ is neutral light.

2. A camera system configured to capture and process image data in accordance with the method of claim 1.

3. A method for generating a high dynamic range image from a single image capture, comprising:
    (a) capturing a single image at a single exposure using a Bayer pattern color filter array to generate raw pixel sensor data for the single image;
    (b) applying a weighting matrix W to the pixel sensor data to provide modified pixel sensor data, wherein W gives more importance to the regions of color components that are better exposed;
    (c) demosaicking the modified pixel sensor data;
    (d) separating the demosaicked modified pixel sensor data into highpass ($X^{HP}$) and lowpass ($\hat{Z}_i^{LP}$) components;
    (e) correcting saturated pixels in the $\hat{Z}_i^{LP}$ components by borrowing across spectrums to yield the low pass data set $\hat{X}_i^{LP}$; and
    (f) computing the high dynamic range image $\hat{X} = \hat{X}_i^{LP} + \hat{X}_i^{HP}(1,1,1)^T$ where $(1,1,1)^T$ is neutral light.

4. A camera system configured to capture and process image data in accordance with the method of claim 3.

5. The method of claim 3 wherein the weighting matrix is chosen from the set:

$$W_\tau = \mathrm{diag}(e)^{-1}\mathrm{diag}((1+\tau, 1-\tau, 1+\tau)).$$

6. A method for generating a high dynamic range image from a single image capture, comprising:
    (a) capturing a single image at a single exposure by a pixel sensor array having a color filter array, thereby generating raw pixel sensor data for the single image capture, the color filter array comprising an array of red, blue and green filters;
    (b) applying a diagonal equalization weighting matrix W to the pixel sensor data to provide modified pixel sensor data comprising an achromatic highpass data set $\hat{X}_i^{HP}$, wherein W gives more importance to the regions of color components that are better exposed;
    (c) correcting saturated pixels in the lowpass ($\hat{Z}_i^{LP}$) components by borrowing across spectrums to yield the low pass data set $\hat{X}_i^{LP}$; and
    (d) computing the high dynamic range image $\hat{X} = \hat{X}_i^{LP} + \hat{X}_i^{HP}(1,1,1)^T$ where $(1,1,1)^T$ is neutral light.

7. The method of claim 6, wherein said color filter array consists of an array of identical red filters, identical green filters, and identical blue filters.

8. The method of claim 6, wherein said color filter array consists of an RGBW array.

9. The method of claim 6, further comprising the step of demosaicking the modified pixel sensor data after said step of applying a diagonal equalization weighting matrix, and before said step of correcting saturated pixels in the lowpass ($\hat{Z}_i^{LP}$) components.

10. A camera system configured to capture and process image data in accordance with the method of claim 9.

11. The method of claim 6, wherein the weighting matrix is chosen from the set:

$$W_\tau = \mathrm{diag}(e)^{-1}\mathrm{diag}((1+\tau, 1-\tau, 1+\tau)).$$

12. The method of claim 6, wherein the difference in effective translucency between at least two filter colors of the color filter array is at least one stop.

13. The method of claim 12, wherein the difference in effective translucency between all three pairs of filter colors of the color filter array is at least one stop.

14. The method of claim 6, wherein one or more additional filters are positioned within an optical path between the scene being captured and the pixel sensor array in order to alter the effective translucency of one or more filter colors in the color filter array.

15. The method of claim 6, wherein the image is captured by a camera, and steps (b)-(d) are performed in a processor outside of the camera using image processing software.

16. A camera system configured to capture and process image data in accordance with the method of claim 6.

17. A video camera system configured to capture and process image data in accordance with the method of claim 6 for generating video comprising a plurality of high dynamic range images.

18. An image processing system for generating a high dynamic range digital image from raw pixel sensor data representing the light intensity measured by each pixel sensor of an image capturing device of a single image capture, wherein the image capturing device is adapted to capture images using a color filter array having a plurality of uniform red, green and blue filters, the system comprising a processor configured to perform the steps of:

(a) apply a diagonal equalization weighting matrix W to the pixel sensor data to provide modified pixel sensor data comprising an achromatic highpass data set $\hat{X}_i^{HP}$, wherein W gives more importance to the regions of color components that are better exposed;

(b) correct saturated pixels in the lowpass $\hat{Z}_i^{LP}$ components by borrowing across spectrums to yield the low pass data set $\hat{X}_i^{LP}$; and (c) compute the high dynamic range image $\hat{X}=\hat{X}_i^{LP}+\hat{X}_i^{HP}(1,1,1)^T$ where $(1,1,1)^T$ is neutral light.

* * * * *